United States Patent [19]

Berger

[11] Patent Number: 4,574,964
[45] Date of Patent: Mar. 11, 1986

[54] BREAKAWAY BAIL

[75] Inventor: Gerald P. Berger, Cedar Rapids, Iowa

[73] Assignee: FMC Corporation, Chicago, Ill.

[21] Appl. No.: 508,975

[22] Filed: Jun. 29, 1983

[51] Int. Cl.$^4$ ............................................. B66C 15/00
[52] U.S. Cl. .................................. 212/149; 212/192; 212/239; 212/262; 403/2
[58] Field of Search ............... 212/149, 150, 155, 158, 212/192, 193, 189, 237, 239, 255, 260, 262, 238; 16/2, 221, 273; 403/2

[56] References Cited

U.S. PATENT DOCUMENTS

| | | | |
|---|---|---|---|
| 1,614,575 | 1/1927 | Siebs | 212/150 |
| 2,051,388 | 8/1936 | Nickles | 212/239 |
| 3,008,176 | 11/1961 | Paine et al. | 16/273 |
| 4,071,970 | 2/1978 | Strizki | 403/2 |
| 4,109,798 | 8/1978 | Comyns-Carr | 212/238 |
| 4,273,244 | 6/1981 | Jensen et al. | 212/189 |
| 4,353,146 | 10/1982 | Brockhaus | 16/273 |
| 4,437,427 | 3/1984 | Mampaeij | 403/2 |

Primary Examiner—Trygve M. Blix
Assistant Examiner—Stephen P. Avila
Attorney, Agent, or Firm—Ronald C. Kamp; Richard B. Megley

[57] ABSTRACT

A breakaway bail for a pedestal mount crane pivotally attached to the gantry by a pin extending through bushings secured to a pair of parallel plates with a spacer between the plates aligned with the bushings. A beam having an upright flange is secured between the plates and a multiple sheave pulley is attached to beam by brackets. Each of the plates has a necked down section between the flange and the spacer to create a high stress area, which area will separate under overload conditions without affecting the connection of the crane to its pedestal.

2 Claims, 3 Drawing Figures

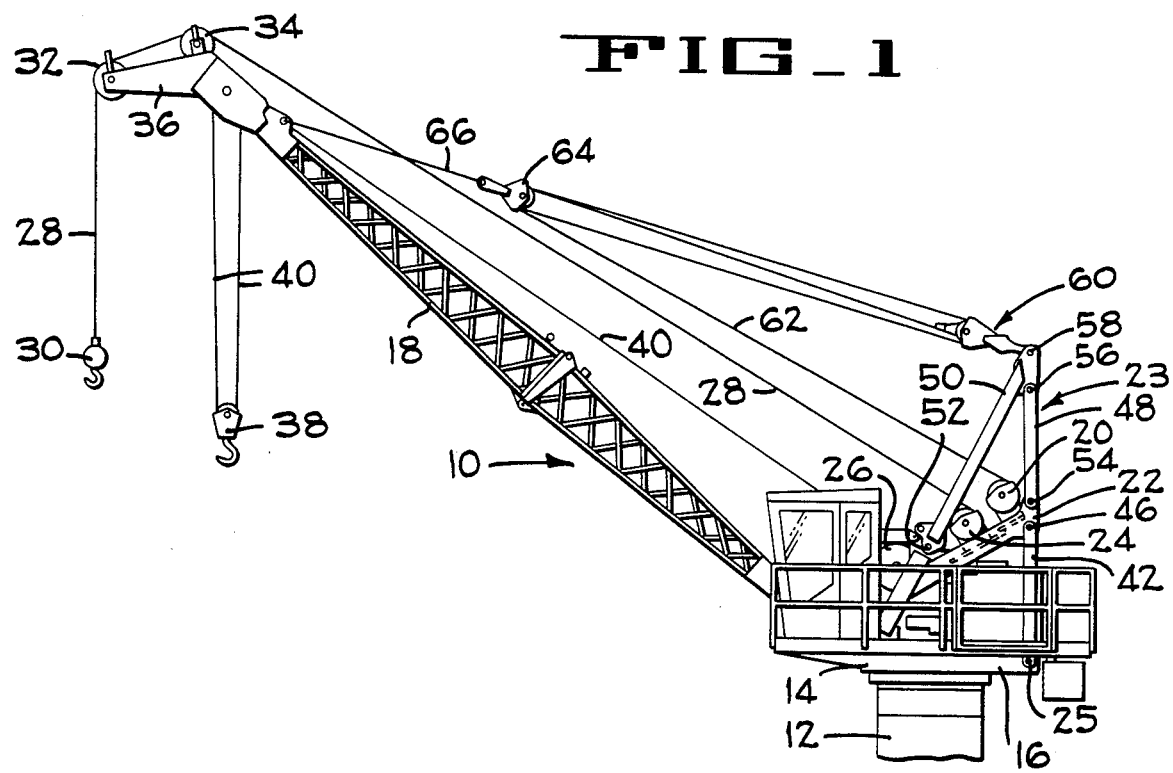

BREAKAWAY BAIL

This invention relates to pedestal mount cranes, and more particularly, to bails for use with such crane.

The present invention provides a bail for a crane, especially for pedestal mount cranes intended for use on offshore platforms, which permits a predetermined and preferred mode of failure. When a crane situated on an offshore platform is working with a ship, accidentally entangling the crane's hook with components attached to, or carried by the ship is possible, especially in rough seas. The severe overload conditions created upon such an occurrence, may rip the crane from its pedestal mounting causing the entire crane and any personnel thereon, including the operator, to fall into the sea. The present invention prevents such a result by predetermining the mode of failure and insuring such failure is in a manner to minimize both the hazard to personnel and the damage to the crane and adjacent property.

The drawings are briefly described as follows:

FIG. 1 is a side elevational view of the crane incorporating the present invention;

FIG. 2 is a detailed view, in side elevation of the preferred embodiment of the bail according to the present invention; and FIG. 3 is a top plan view of the bail shown in FIG. 2.

Referring to FIG. 1, a crane, indicated generally at 10, is swingably mounted on a pedestal 12 which is rigidly attached to an offshore platform, for example. The swinging movement is provided by a turntable 14 connected to the pedestal 12 and to the frame 16 of the crane. A boom 18 is pivotally mounted on the frame 16 and is angularly adjustable by a boom hoist 20 mounted on a winch frame 22. The winch frame 22 also supports an auxiliary hoist 24 and a main hoist 26. A whip line 28, having a hook 30 attached to its free end, is trained over sheaves 32 and 34 rotatably mounted on a boom tip extension 36 and wound on the auxiliary hoist 24. Main hook block 38 is suspended by a wire rope 40 trained over a sheave or sheaves (not shown) on the boom tip and wound on hoist 26.

A winch frame 22 is attached at its forward end to the frame 16 of the crane and is supported by a pair of links, one of which is shown at 42, pinned by pins 25 to the frame 16 and by pins 46 to the rearward end of the winch frame 22. An A-frame gantry, indicated generally at 23, comprises a pair of vertical legs 48 and a pair of angled or slanted legs 50. Each of the legs 50 is pinned at its lower end by a pin 52 to a bracket secured to the winch frame 22. Each of the vertical legs 48 is pinned to the winch frame 22 by pin 54 positioned vertically above the corresponding pin 46 and by pin 56 to a bracket attached to the upper end of each leg 50. A cross-brace (not shown) extends between and is secured to the legs 50. A bail, indicated generally at 60, is pinned to, and positioned between the brackets on the legs 50 by a pin 58. A wire rope 62 wound on boom hoist 20 is reeved between a multiple sheave bridle 64, which is secured to the tip of the boom 18 by pendants 66, and the sheaves carried by the bail 60; the rope 62 being secured to or dead-ended at the bail 60. Reeling in the wire rope 62 by the boom hoist 20 causes the boom tip to be elevated, i.e. the boom radius reduced, and unwinding the wire rope 62 causes the boom tip to be lowered, i.e. the boom radius increased.

Referring now to FIGS. 2 and 3, the bail 60 has a pair of parallel tension plates 72 and 74 secured to the ends of a tube 68. A pair of ring members 76 and 78, each having a bushing secured within a central bore, are secured to the outer surfaces of the plates 72 and 74 respectively and are positioned generally in line with the center of the tube 68. The interior diameter of the tube 68 is larger than the interior diameter of the bushings 70 so that the pin 58 engages only the bushings 70. The tube 68, plates 72 and 74 and ring members 76 and 78 are positioned between, and pivotally secured to the brackets on the upper ends of the legs 50 by the pin 58; the pin 58 thereby defining a pivot axis for the bail 60.

Each of the plate members 72 and 74 has a circular section 80 attached to the tube 68 and the adjacent ring 76 or 78 which makes a smooth transition to an arcuate necked-down section 82. A triangular section 84 is formed on the end of each plate 72 and 74 opposite the circular section 80. A transverse beam 86 having an upright flange 88 is secured between the plates 72 and 74. A multiple sheave pulley 87 is rigidly secured to the beam 86 by means of brackets 90. The beam 86 transfers the loads imposed on the pulley 87 to the plates 72 and 74. Since the bail 60 can pivot and since the forces applied to the pulley are through a wire rope, the plates 72 and 74 are subjected to stresses which are nearly pure tension. The necked-down section 82 is designed so that the stress in its minimum cross-sectional area 92 will reach the yield point before any other component of the crane in most situations. Thus, the bail 60, specifically the tension plates 72 and 74, will fail by separation across the necked-down section. The safety factor designed into the necked-down section 82 is adequate to withstand those loads anticipated and actually encountered during normal operation of the crane. However, when the loads become excessive, as when the hook accidently becomes entangled with a ship, the resulting stresses in the necked-down section will be of a magnitude to cause separation thereacross. With such separation, the loading on the crane is reduced. Of course, without the bail 60 to support the boom it will start to fall. As it falls, the hook 30 and hook block 38 will move toward the boom tip because of the associated reeving and the difference in the pivot axis for the boom and the associated winch. Depending upon the position of these two hooks relative to the boom and the angle of the boom, one of the hooks may engage the boom, in what is commonly called a two-block condition, which would then tend to slow or retard the fall of the boom. In any event, the crane will remain on its pedestal, and only relatively minor repair or replacement of damaged crane components will be required to return the crane to service.

While one embodiment of the present invention has been shown and described herein, various changes and modifications may be made therein without departing from the spirit of the invention as defined by the scope of the appended claims.

What is claimed is:

1. An arrangement for assuring a preferred mode of failure for a crane mounted on a pedestal when subjected to an overload comprising:
   an upper rotatably mounted on said pedestal;
   a boom pivotally attached to said upper;
   a pulley rotatably mounted on said boom;
   a hoist winch mounted on said upper;
   a first wire rope trained over said pulley and wound on said hoist winch;
   a hook suspended from said first rope, the mounting of said upper on said pedestal being capable of withstanding a maximum design load moment applied to said hook;

a gantry secured to said upper;

a boom winch mounted on said upper;

a second wire rope wound on said boom winch and extending between said boom and said gantry to control the angle of said boom;

bushing means attached to tension plate means for pivotally attaching said tension plate means to said gantry;

a multiple sheave pulley attached to said plate means over which said second wire rope is trained; and said tension plate means having a reduced cross-sectional area which creates tension stresses sufficient to cause separate of said plate means at a load moment less than said design load moment.

2. The invention according to claim 1 wherein said tension plate means consists of a pair of parallel tension plates and further comprising:

a spacer tube secured between said plates and aligned with said bushing means;

a pin engageable with said bushings for pivotal attachment of said bail to said gantry;

a transverse beam having an upright flange affixed between said plates;

brackets secured to the said beam for mounting said pulley; and each of said plates having upper and lower curved surfaces between said flange and said tube to define said reduced cross-sectional area.

* * * * *